(12) United States Patent
Kitta

(10) Patent No.: US 6,310,925 B1
(45) Date of Patent: Oct. 30, 2001

(54) PHASE ANGLE DETECTOR AND FREQUENCY DISCRIMINATOR EMPLOYING THE SAME

(75) Inventor: Tatsuaki Kitta, Kawasaki (JP)

(73) Assignee: Fujitsu Limited, Kanagawa (JP)

( * ) Notice: Subject to any disclaimer, the term of this patent is extended or adjusted under 35 U.S.C. 154(b) by 0 days.

(21) Appl. No.: 09/131,879

(22) Filed: Aug. 10, 1998

(30) Foreign Application Priority Data

Jan. 30, 1998 (JP) .................................................. 10-017622

(51) Int. Cl.$^7$ ........................... H04L 27/14; H04L 27/16; H04L 27/22; H04L 27/06

(52) U.S. Cl. ............................................ 375/326; 375/340

(58) Field of Search .................................... 375/326, 340; 455/110; 364/484

(56) References Cited

U.S. PATENT DOCUMENTS

| | | | |
|---|---|---|---|
| 3,956,623 | * 5/1976 | Clark et al. ............................ | 235/186 |
| 4,715,001 | * 12/1987 | Deem et al. ............................ | 364/484 |
| 5,640,417 | 6/1997 | Barabash et al. .................... | 375/222 |
| 5,982,821 | * 11/1999 | Kingston et al. .................... | 375/326 |
| 6,032,028 | * 2/2000 | Dickey et al. ........................ | 455/110 |

OTHER PUBLICATIONS

S.J. Roome, Analysis of Quadrature Detectors Using Complex Envelope Notatio, IEEE 1989, pp. 95–100.*
T.G. Hodgkinson, R.A. Harmon. D.W. Smith, and P.J. Chidgey, In–Phase Quadrature Detection Using 90 Optical Hybrid Receiver: Experiments and Design Considerations, IEEE 1987, pp. 260–267.*

* cited by examiner

*Primary Examiner*—Stephen Chin
*Assistant Examiner*—Tony Al-Beshrawi
(74) *Attorney, Agent, or Firm*—Arent Fox Kintner Plotkin & Kahn, PLLC

(57) ABSTRACT

According to the present invention, in accordance with the first to fourth quadrants on the phase plane for signal points, a phase angle detector converts an I channel signal or a Q channel signal obtained by a demodulator, by using individually set operating expressions, so as to correlate the angle (phase angle) for a signal point on the plane phase with a predetermined one-dimensional coordinate. More specifically, the phase angle that extends from a border point in an arbitrary quadrant on the phase plane to a border position shifted 360° is allocated for a specific one-dimensional coordinate. The coordinate value on the one-dimensional coordinate is calculated by using the operating expression which is set in accordance with the first to the fourth quadrant of the signal point which is detected using the I channel signal and the Q channel signal. This can be an arbitrary expression; however, as simple an operating expression as possible is selected so that the calculation can be performed by as simple a circuit as possible.

12 Claims, 16 Drawing Sheets

EXAMPLE ARRANGEMENT OF SIGNAL POINTS ON PHASE PLANE FOR 64 QAM

EXAMPLE ARRANGEMENT OF SIGNAL POINTS ON PHASE PLANE FOR 64 QAM

CONVENTIONAL FREQUENCY DISCRIMINATOR

MULTIPLE-QAM SYSTEM DEMODULATOR

FIG.5 PRINCIPLE FOR DETECTING A PHASE ANGLE USING I CHANNEL SIGNAL

FREQUENCY DISCRIMINATOR OF FIRST EMBODIMENT

FIG.7 PRINCIPLE(2) FOR DETECTING A PHASE ANGLE USING I CHANNEL SIGNAL

PRINCIPLE(3) FOR DETECTING A PHASE ANGLE USING I CHANNEL SIGNAL

FIG.9

CONVERSION EXPRESSIONS USING I CHANNEL SIGNAL

-180°~ 0°~ +180°

|  | B←C←D→A→B<br>-180°← 0°→ +180° | C←D←A→B→C<br>-180°← 0°→ +180° | D←A←B→C→D<br>-180°← 0°→ +180° | A←B←C→D→A<br>-180°← 0°→ +180° |
|---|---|---|---|---|
| 1st QUADRANT | 2lm-i | lm-i | -i | -(lm+i) |
| 2nd QUADRANT | -2lm-i | lm-i | -i | -(lm+i) |
| 3rd QUADRANT | i | -(lm-i) | 2lm+i | lm+i |
| 4th QUADRANT | i | -(lm-i) | -2lm+i | lm+i |

0°~ 360°

|  | D→A→B→C<br>0° → +360° | A→B→C→D<br>0° → +360° | B→C→D→A<br>0° → +360° | C→D→A→B<br>0° → +360° |
|---|---|---|---|---|
| 1st QUADRANT | 2lm-i | lm-i | 4lm-i | 3lm-i |
| 2nd QUADRANT | 2lm-i | lm-i | -i | 3lm-i |
| 3rd QUADRANT | 4lm+i | 3lm+i | 2lm+i | lm+i |
| 4th QUADRANT | i | 3lm+i | 2lm+i | lm+i |

ANOTHER EXAMPLE OF PHASE DETECTOR

PRINCIPLE FOR DETECTING A PHASE SIGNAL ANGLE USING Q CHANNEL SIGNAL

FREQUENCY DISCRIMINATOR OF SECOND EMBODIMENT

PRINCIPLE FOR DETECTING A PHASE SIGNAL ANGLE USING Q CHANNEL SIGNAL

FIG.14

CONVERSION EXPRESSIONS USING Q CHANNEL SIGNAL

| | C←D←A→B→C<br>-180°← 0°→ +180° | D←A←B→C→D<br>-180°← 0°→ +180° | A←B←C→D→A<br>-180°← 0°→ +180° | B←C←D→A→B<br>-180°← 0°→ +180° |
|---|---|---|---|---|
| 1st QUADRANT | q | -(Im-q) | -2Im+q | Im+q |
| 2nd QUADRANT | 2Im-q | Im-q | -q | -(Im+q) |
| 3rd QUADRANT | -2Im-q | Im-q | -q | -(Im+q) |
| 4th QUADRANT | q | -(Im-q) | 2Im+q | Im+q |

| | A→B→C→D<br>0°→ +360° | B→C→D→A<br>0°→ +360° | C→D→A→B<br>0°→ +360° | D→A→B→C<br>0°→ +360° |
|---|---|---|---|---|
| 1st QUADRANT | q | 3Im+q | 2Im+q | Im+q |
| 2nd QUADRANT | 2Im-q | Im-q | 4Im-q | 3Im-q |
| 3rd QUADRANT | 2Im-q | Im-q | -q | 3Im-q |
| 4th QUADRANT | 4Im+q | 3Im+q | 2Im+q | Im+q |

FREQUENCY DISCRIMINATOR OF THIRD EMBODIMENT

PHASE ANGLE DETECTOR AND FREQUENCY DISCRIMINATOR EMPLOYING THE SAME

BACKGROUND OF THE INVENTION

1. Field of the Invention

The present invention relates to a frequency discriminator, in a multiple quadrature amplitude modulation (QAM) system, for detecting a difference between a carrier frequency for a received signal and a reference carrier frequency for use in demodulation, and to a phase angle detector, provided in the frequency discriminator, for detecting a phase angle of a received signal on a phase plane, and in particular to a phase angle detector having a simple structure which can detect the direction and the degree of the phase angle of a received signal and to a frequency discriminator employing such a phase angle detector.

2. Related Arts

As a consequence of recent discussions concerning the employment of multi-digital channels for cable televisions, the use of 16 QAM and 256 QAM systems for this purpose has become common. In the multiple quadrature amplitude modulation system, $2^n$ types of signs correspond to $2^n$ signal points, and sign information available at a signal point is transmitted by employing an I channel signal (hereinafter referred to simply as an I signal), which corresponds to the real numerical value of the signal point, and a Q channel signal (hereinafter referred to simply as a Q signal), which corresponds to an imaginary number. The I signal and the Q signal are multiplied by carrier signals whose phases are shifted 90°, and the thus obtained signals are added together. The resultant signal is transmitted after its frequency has been raised to that of a carrier frequency required for transmission.

On the reception side, the received signal is down-converted into a symbol rate and the resultant signal is multiplied by a reference carrier signal, whose phase is shifted 90°, to demodulate the I signal and the Q signal in a baseband. Since on the reception side an oscillator for generating a reference carrier signal fluctuates due to manufacturing variances or as a result of the elapse of time, a carrier reproduction circuit called a carrier recovery circuit is provided in a receiver to generate a carrier reference signal having the same frequency as a carrier signal on the transmission side.

The carrier recovery circuit also captures the frequency of a reference carrier signal in order to eliminate the difference between the phase of a received signal at the signal point and the phase of the signal at the original signal point. However, in the multiple quadrature amplitude modulation system, since the intervals at which the signal points are positioned in space are small, the capture range for a PLL circuit in the carrier recovery circuit is so small, and the recovery of an accurate reference frequency is required at the time of demodulation. A frequency discriminator for detecting the difference between the carrier frequency of a received signal and a reference carrier frequency is employed as means for enlarging the capture range of the carrier recovery circuit. An obtained frequency difference is used as a control reference for the carrier recovery circuit, and detection of a frequency difference across a wider range is enabled.

FIG. 1 is a diagram illustrating an example arrangement of signal points on the phase plane for the 64 QAM. As is shown in FIG. 1, 64 signal points (black dots) are located on the phase plane which consists of a real I channel axis side and an imaginary Q channel axis side. A 6-bit sign string is allocated for these 64 signal points. The coordinates along the I axis and the Q axis corresponding to an allocated signal point are transmitted as an I signal and a Q signal.

When the frequency of the reference carrier on the reception side is shifted from the carrier frequency of the received signal, a demodulated signal point is rotated clockwise or counterclockwise. When, for example, a carrier frequency Fin of a received signal is higher than reference carrier frequency Flo for demodulation, a sequentially demodulated signal point is rotated counterclockwise from signal point P1 to P2, for example. Therefore, a difference Δf between the two carrier frequencies can be acquired by detecting the phase angle between the sequential signal points. When the two carrier frequencies Fin and Flo match, a signal point is not moved.

FIG. 2 is a diagram illustrating a conventional frequency discriminator. In FIG. 2, input to an I channel input terminal and a Q channel input terminal are an I signal and a Q signal, which are obtained by multiplying a received signal by demodulation reference carrier signals, for an I channel and a Q channel, whose phases are shifted 90°. A phase angle detector 10 calculates $\tan^{-1}(Q/I)$ by using the I signal and the Q signal to obtain phase th1 for a demodulated signal point. A phase difference detector 14 calculates phase difference dth for sequentially demodulated signal points. The phase difference detector 14 comprises: a delay flip-flop 15 for delaying the phase th1 for the signal point (θ in FIG. 1) by using a demodulation reference clock; an adder 16 for calculating a difference between the phases th1 and th2 for the sequential signal points; and a converter 17 for calculating an absolute phase difference dth by using the output th2−th1 of the adder 16.

The frequency discriminator further includes an amplitude detector 12 for acquiring an amplitude d1 for a demodulated signal point from the I signal and the Q signal, and a signal point 18 for detecting an event when signal points outside a mask circle S shown in FIG. 1 are sequentially demodulated. The amplitude detector 12 performs an arithmetic operation $(I^2+Q^2)^{1/2}$ to obtain the amplitude d1 for the signal point, and a comparator 19 compares the amplitude d1 with the Im radius of the mask circle S. When d1>Im, output d2 goes to level H, and when signal points outside the mask circle S are sequentially received, output d4 is raised to level H by the delay flip-flop 20 and an AND gate 21.

In response to a detection signal d4, a complete integration circuit 22 accumulates the phase difference dth. The complete integration circuit 22 includes an adder 23 and a flip-flop 24 for latching the output of the adder 23 when the detection signal d4 is at level H.

As is described above, when signal points outside the mask circle S are sequentially detected, the conventional frequency discriminator calculates phase differences between the sequential signal points and adds them together. Since the signal point is moved counterclockwise or clockwise in accordance with the difference between the carrier frequency of a received signal and a reference carrier frequency, the frequency difference can be calculated by using the sum of the phase differences dth, and can be output, including its shift direction, to the output terminal OUT.

However, to constitute the frequency discriminator in FIG. 2 by using a common logic circuit, the phase angle detector 10, which calculates the phase angle for a signal point on the phase plane, requires an arithmetic operation circuit to perform the calculation for $\tan^{-1}(Q/I)$. A logic circuit for performing such a complicated calculation as that required for $\tan^{-1}(Q/I)$ is large, and therefore, is not appropriate for integration. Even when a lookup table is employed for the calculation results, rather than the complicated operation circuit, for the table a large expenditure for chips is required, and still the problem is not resolved.

SUMMARY OF THE INVENTION

It is, therefore, one objective of the present invention to provide a phase angle detector having a simple structure which can acquire a phase angle for a signal point on the phase plane.

It is another objective of the present invention to provide a frequency discriminator with a small circuit size by using a phase angle detector having a simple structure, which can acquire a phase angle for a signal point on the phase plane.

To achieve the above objectives, according to the present invention, in accordance with the first to fourth quadrants on the phase plane for signal points, a phase angle detector converts an I channel signal or a Q channel signal obtained by a demodulator, by using individually set operating expressions, so as to correlate the angle (phase angle) for a signal point on the plane phase with a predetermined one-dimensional coordinate.

More specifically, the phase angle that extends from a border point in an arbitrary quadrant on the phase plane to a border position shifted 360° is allocated for a specific one-dimensional coordinate. The coordinate value on the one-dimensional coordinate is calculated by using the operating expression which is set in accordance with the first to the fourth quadrant of the signal point which is detected using the I channel signal and the Q channel signal. This can be an arbitrary expression; however, as simple an operating expression as possible is selected so that the calculation can be performed by as simple a circuit as possible.

Whether the signal point is in the first, the second, the third or the fourth quadrant can be easily detected by employing a combination of the most significant bits of the I channel signal and of the Q channel signal. Four outputs of the four type operation circuit is selected, at a maximum, in accordance with the detection results, and the phase angle value allocated for the one-dimensional coordinate is generated.

As will become apparent in the course of the description of the preferred embodiments, which will be given later, when a simplified operating circuit is employed, the frequency discriminator employing the phase angle detector can at least determine the extent and the direction (the positive direction or the negative direction) of the frequency difference, although the converted phase angle value for the one-dimensional coordinate is not always linear. While employing the extent and the direction of the detected frequency difference as references, the carrier recovery circuit can detect, across a wide range, the phase difference between the received carrier signal and the demodulation reference carrier signal. Further, the local carrier signal for the PLL circuit which constitutes the carrier recovery circuit can be captured by using the phase difference.

To achieve the above described objectives, according to the present invention, a phase angle detector, which detects a phase angle on a phase plane for a signal point specified by an I channel signal and a Q channel signal, comprises:

a quadrant detection section for, in response to the I channel signal and/or the Q channel signal, detecting a quadrant on the phase plane for the signal point and for generating a quadrant detection signal; and a phase angle calculating section for performing a calculation using the I channel signal or the Q channel signal which corresponds to the quadrant detection signal to convert the phase angle on the phase plane into a phase angle for a predetermined one-dimensional coordinate.

In addition, according to the present invention, to achieve the above objectives, a frequency discriminator, for detecting a frequency difference between a quadrature amplitude modulation carrier and a demodulation reference carrier, comprises:

a phase angle detector, including a quadrant detection section for, in response to the I channel signal and/or the Q channel signal, detecting a quadrant on the phase plane for the signal point and for generating a quadrant detection signal, and a phase angle calculating section for performing a calculation using the I channel signal or the Q channel signal which corresponds to the quadrant detection signal to convert the phase angle on the phase plane into a phase angle for a predetermined one-dimensional coordinate; and an integration circuit for receiving the phase angle for the one-dimensional coordinate, which is obtained by the phase angle detector, and for, when signal points outside a predetermined mask circle S are sequentially demodulated, accumulating a phase angle difference between the signal points.

BRIEF DESCRIPTION OF THE DRAWINGS

FIG. 9 is a table showing conversion expressions for a phase angle and one-dimensional coordinate $\theta i$ when an I channel signal is employed;

FIG. 14 is a table showing conversion expressions for a phase angle and one-dimensional coordinate $\theta q$ when a Q channel signal is employed;

DETAILED DESCRIPTION OF THE PREFERRED EMBODIMENTS

The preferred embodiments of the present invention will now be described while referring to the accompanying drawings. The technical range of the present invention, however, is not limited to these embodiments.

[Multiple-Quadrature Amplitude Modulation (QAM) System]

The multiple-quadrature amplitude modulation system will be described before a phase angle detector according to the preferred embodiments of the present invention is explained.

Figure 1:
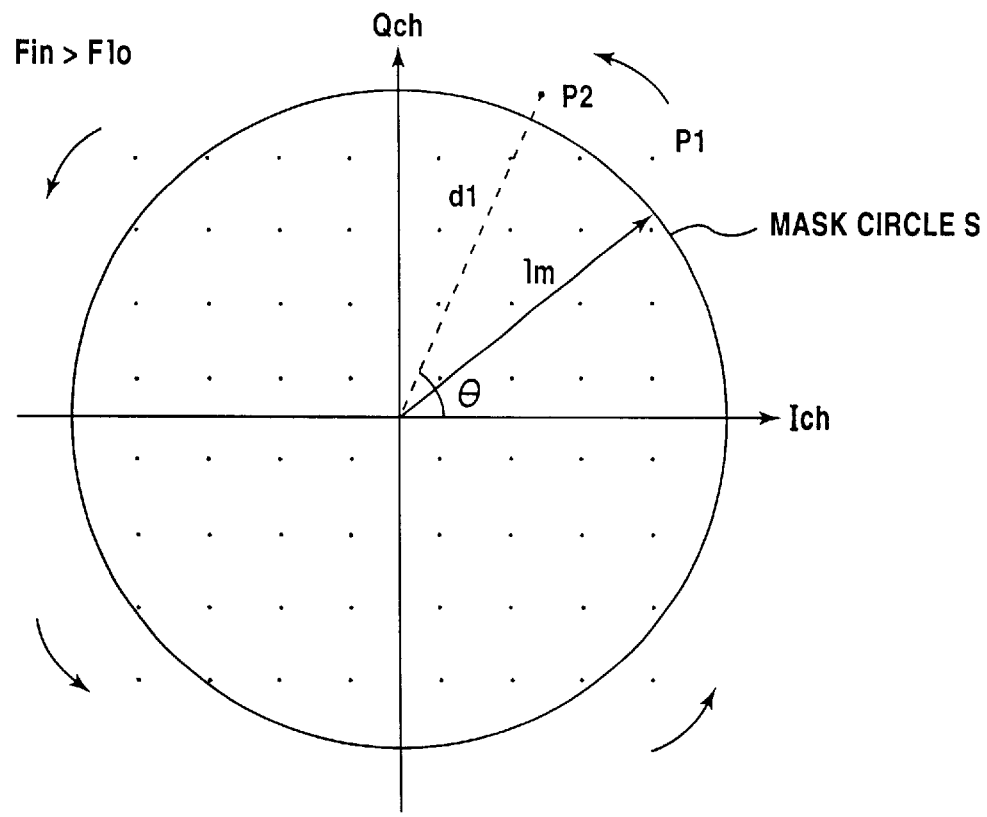
FIG. 1 is a diagram illustrating an example arrangement of signal points on a phase plane for 64 QAM.
Figure 3:
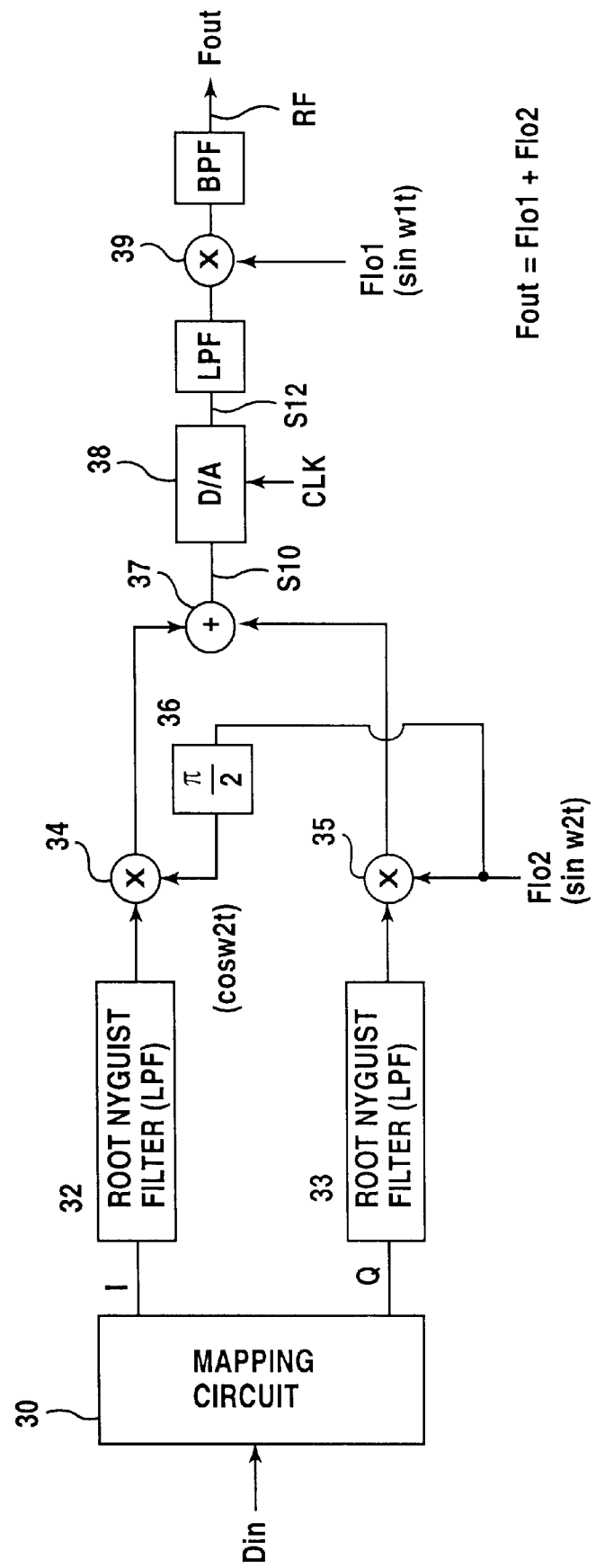
FIG. 3 is a schematic diagram illustrating a multiple-QAM system modulator.

FIG. 3 is a schematic diagram showing a multiple-QAM system modulator. A signal Din carrying transmission information is mapped to an I signal and a Q signal by a mapping circuit 30. Assuming that the signal Din includes six bit strings, $2^6$ (=64) different bit string signals are mapped to signal points as shown in FIG. 1. Specifically, the mapping circuit 30 is a serial/parallel converter which assigns the first three six-bit strings to a three-bit I signal, and the last three bit strings to a three-bit Q signal. As a result, 64 different bit-string signals are coded for 64 signal points.

The I signal and the Q signal respectively pass through root Nyquist filters 32 and 33, which are low-pass filters, and are multiplied by multipliers 34 and 35 using reference carrier signals which have a second reference frequency Flo2 and whose phases are shifted 90°. The resultant signals are added together by an adder 37. An obtained digital signal S10 is converted, by a D/A converter 38, into an analog signal S12, which is synchronized with a clock CLK. Finally, the analog signal S12 is multiplied by a multiplier 39 with a reference carrier signal having a first reference frequency Flo1, and a high-frequency transmission signal RF having a carrier frequency Fout is transmitted. Therefore, the carrier frequency is Fout=Flo1 and Flo2.

Figure 4:
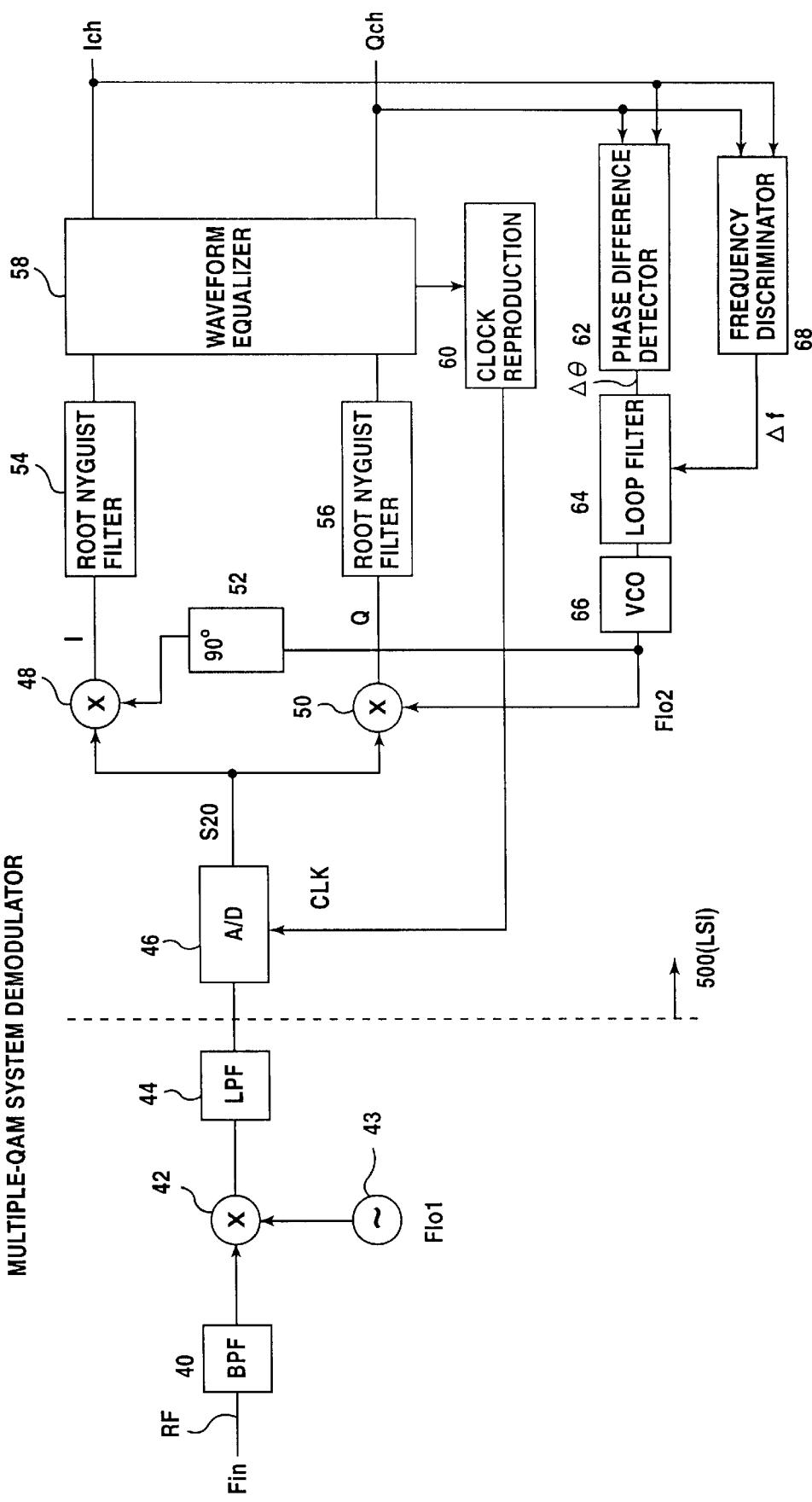
FIG. 4 is a schematic diagram illustrating a multiple-QAM system demodulator.

FIG. 4 is a schematic diagram illustrating a multiple-QAM system demodulator. A received high-frequency signal RF selected by a tuner (not shown) passes through a band-pass filter 40 and is multiplied by a multiplier 42 with a first reference carrier signal having a first demodulation reference frequency Flo1 43. As a result, the signal RF is down-converted to a symbol rate. The thus obtained signal is passed through a low-pass filter 44 and is sampled by an A/D converter 46 in synchronization with a reference clock CLK to obtain a digital signal S20.

The signal S20, which includes an I signal and a Q signal, is multiplied, by multipliers 48 and 50, with second reference carrier signals having a second reference carrier frequency Flo2 whose phases have been shifted 90°, so that the signal S20 is separated into a I signal and a Q signal in a baseband. The demodulator also includes a 90° phase shifter 52.

The obtained I signal and Q signal respectively pass through root Nyquist filters 54 and 56, which are low-pass filters. Then, the frequency distributions for the I signal and the Q signal, which are distorted by the frequency property of a transmission medium, are equalized by a waveform equalizer 58. A clock reproduction circuit 60 reproduces a reference clock CLK which is synchronized with the clock of a transmission signal.

The first reference carrier signal Flo1, which is to be input to the multiplier 42 which is a reduction converter for a reception side demodulator, is generated by a local oscillator 43. The local oscillator 43 is in a free-run state, and the oscillator frequency Flo1 fluctuates due to manufacturing variances and the elapse of time.

Therefore, since the carrier frequency of the signal S20 down-converted by the reduction converter, is also varied, the second reference carrier signal Flo2 having a tracking frequency therefore must be generated, and thus the demodulator requires a carrier recovery circuit. The carrier recovery circuit constitutes a PLL circuit which comprises: a phase difference detector 62 for detecting a phase difference $\Delta\theta$ between sequential signal points by using an I signal and a Q signal; a loop filter 64; a voltage control oscillator 66 for generating a reference carrier having a frequency Flo2 corresponding to the phase difference $\Delta\theta$; and multipliers 48 and 50. Furthermore, in order to expand the capture range of the PLL circuit, a frequency discriminator 68 is provided for detecting a frequency difference $\Delta f$ between a carrier frequency Fin of a received signal RF and a demodulation reference carrier frequency Flo1+Flo2. Using the frequency difference $\Delta f$ detected by the frequency discriminator 68 as a reference, the phase difference detector 62 can detect the phase difference $\Delta\theta$ across a wider range (a range greater than that of the wavelength). The frequency discriminator 68 is a component related to the present invention.

[Principle of a Phase Angle Detector and its Circuit Structure]

The phase angle detector provided for the frequency discriminator in this embodiment does not perform the complicated calculation $\tan^{-1}(Q/I)$, as is performed conventionally, but instead employs the I signal and the Q signal to detect a quadrant for a signal point and converts the phase angle within a 360° range into a predetermined one-dimensional coordinate in accordance with a simple expression set for each quadrant.

Figure 5:
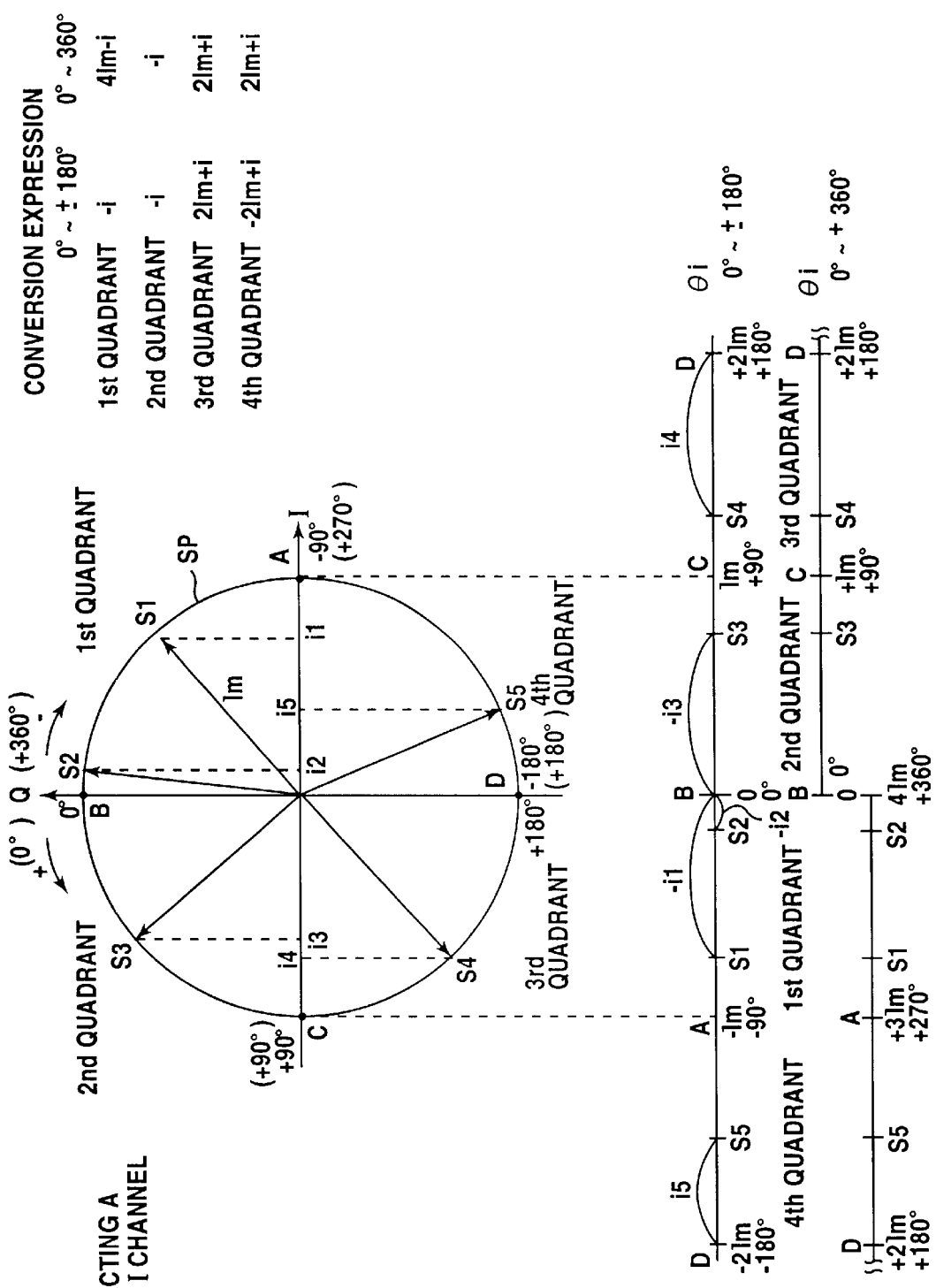
FIG. 5 is a diagram for explaining an example principle for detecting a phase angle according to the present invention.

FIG. 5 is a diagram for explaining the principle for the detection of a phase angle according to this embodiment. In FIG. 5, a phase angle is converted into one-dimensional coordinate $\theta i$ in accordance with a simple expression which is set for each detected quadrant and which employs an I signal value. In the example in FIG. 5, phase angles of –180° for signal points S1 to S5 are converted into one-dimensional coordinates –2(Im) to +2(Im). The signal points S1 to S5 are identical, and are rotated in accordance with the above described frequency difference. The signal points S1 to S5 are, therefore, positioned along circle SP, which has a radius of Im.

In FIG. 5, assume that, with point B as the starting point, 0° to +180° is a counterclockwise phase angle, and 0° to –180° is a clockwise phase angle. When a signal point is located in the second quadrant, as the phase angle is increased from 0° to +90° (from point B to point C), the I value at the signal point is reduced from 0 to–lm. Therefore, when the expression corresponding to the second quadrant is set to –i, the phase angle 0° to 90° for the one-dimensional coordinate $\theta i$ (=–i) can correspond to 0 to +lm. In FIG. 5, signal point S3 is located in the second quadrant, and its I value $i_3$ can correspond to S3 in the one-dimensional coordinate $\theta i$ as $\theta i=-i_3$.

Furthermore, when a signal point is located in the third quadrant, the I value of the signal point is increased from –Im to 0 as the phase angle is increased from +90° to +180° for the one-dimensional coordinate $\theta i$ (=2(Im)+i) can correspond to +Im to +2(Im). In FIG. 5, signal point S4 is located in the third quadrant, and its I value $i_4$ (<0) corresponds to S4 in the one-dimensional coordinate θi as θi=2(Im)+$i_4$.

Similarly, when a signal point is located in the first quadrant, the I value of the signal point is increased from 0 to +lm as the phase angle is decreased from 0° to −90° (point B to point A). Therefore, when the expression corresponding to the first quadrant is set to −i, the phase angle 0° to −90° can correspond to 0 to −lm for the one-dimensional coordinate θi (=−i). In FIG. 5, signal points S1 and S2 are located in the first quadrant, and their I values $i_1$ and $i_2$ correspond to S1 and S2 for the one-dimensional coordinate θi as θi=−$i_1$ and −$i_2$.

In addition, when a signal point is located in the fourth quadrant, the I value of the signal point is reduced from +lm to 0 as the phase angle is reduced from −90° to−180° (point A t point D). Therefore, when the expression corresponding to the fourth quadrant is set to −2(Im)+i, the phase angle of −90° to −180° can correspond to −lm to−2(Im) for the one-dimensional coordinate θi (=−2(Im)+i). In FIG. 5, signal point S5 is located in the fourth quadrant, and its I value $i_5$ corresponds to S5 for the one-dimensional coordinate θi as θi=−2(Im)+$i_5$.

As is described above, in the example in FIG. 5, the phase angle ranging from −180° to +180° at point B is converted into the one-dimensional coordinate θi for −2(Im) to +2(Im). The conversion expression is the simple one given below that is set in accordance with the first to the fourth quadrants.

first quadrant: −i
second quadrant: −i
third quadrant: 2(Im)+i
fourth quadrant: 2(Im)+i The quadrant wherein a signal point is positioned can be easily detected from the signs of the I value and the Q value for the signal points. When the I and the Q digital values are represented by a complement of two, a quadrant wherein the signal point is located can be easily detected by using a combination of the most significant bits. The combination of the most significant bits when a complement of two is displayed is as follows:

first quadrant: I, Q=0, 0
second quadrant: I, Q=1, 0
third quadrant: I, Q=1, 1
fourth quadrant: I, Q=0, 1

Therefore, the quadrant wherein the signal point is located can be acquired simply by decoding the most significant bits of the I signal and the Q signal.

Figure 2:
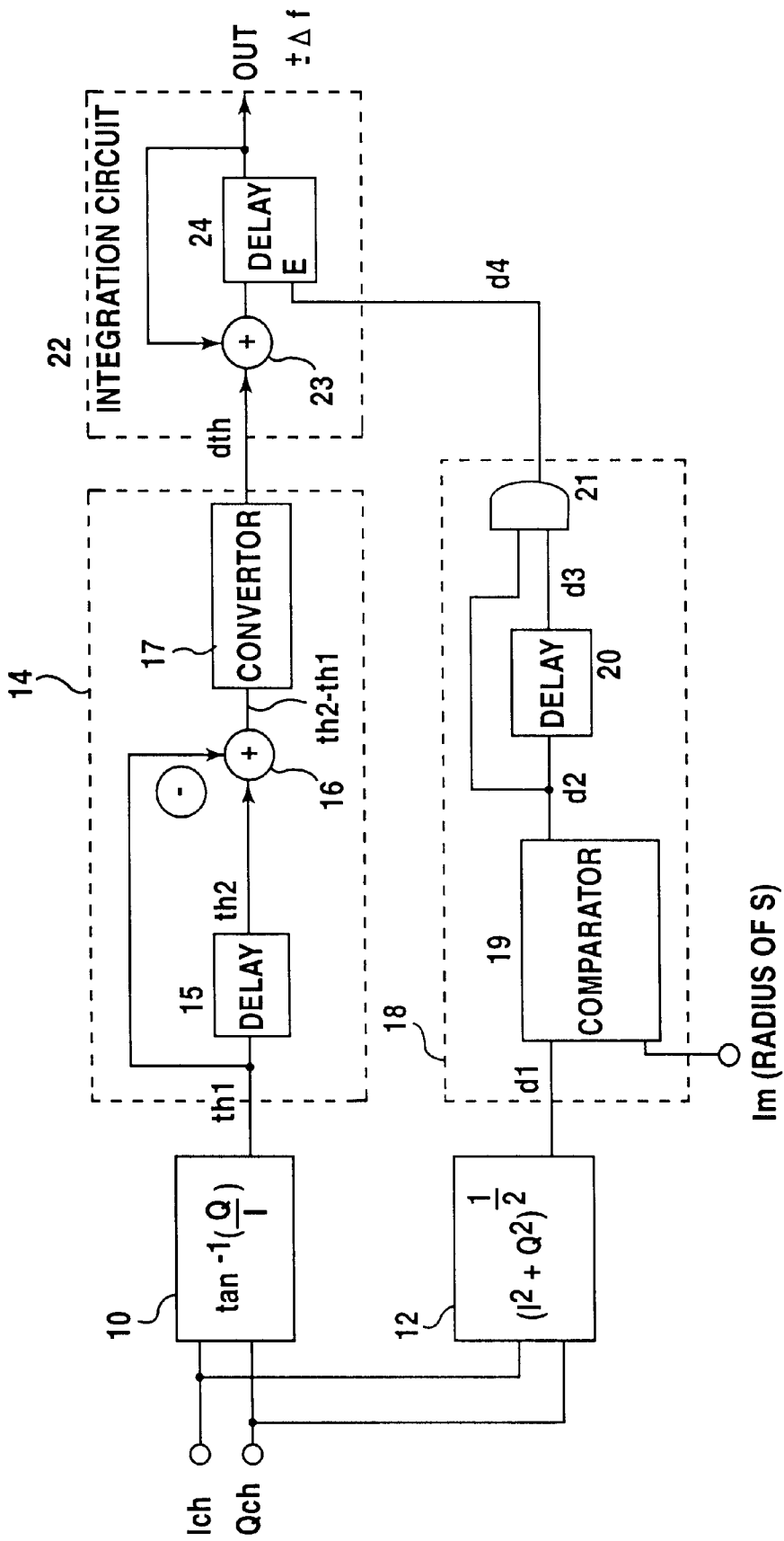
FIG. 2 is a diagram illustrating a conventional frequency discriminator.
Figure 6:
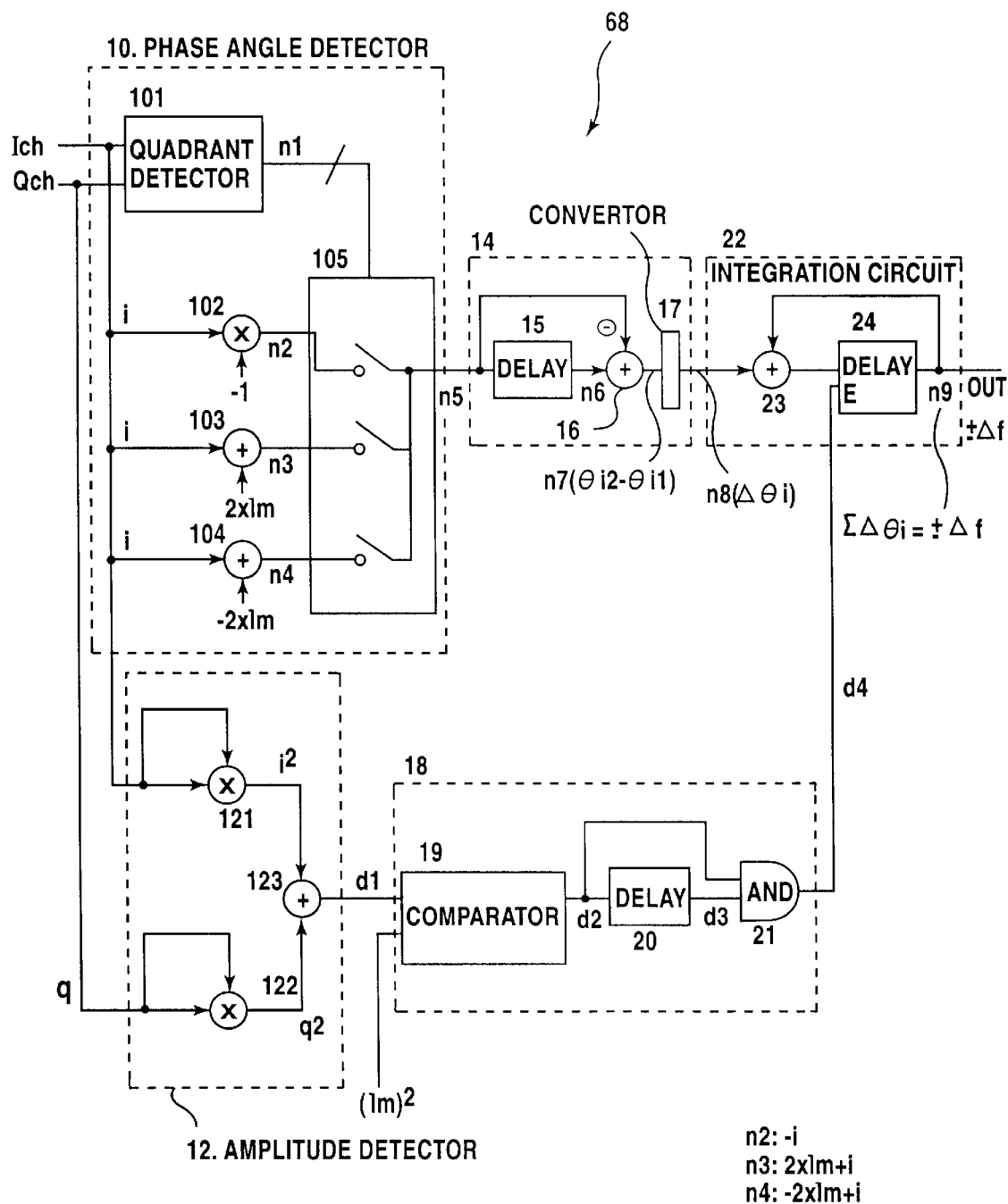
FIG. 6 is a circuit diagram showing a frequency discriminator according to a first embodiment employing the principle in FIG. 5.

FIG. 6 is a circuit diagram illustrating a frequency discriminator according to a first embodiment employing the principle shown in FIG. 5. In FIG. 6, the same reference numerals as are used for the circuit in FIG. 2 are also used to denote corresponding or identical components. As is shown in FIG. 4, an I signal and a Q signal are digital signals having a predetermined number of bits, and when there are 64 signal points, the I and Q signals are each 3-bit digital signals. A phase angle detector 10 comprises a quadrant determiner 101, a multiplier 102, adders 103 and 104 and a selector 105.

As previously mentioned, the quadrant detector 101 employs a combination of the most significant bits of the I signal and of the Q signal to detect the quadrant wherein a signal point is located. In accordance with the results of the detection, the quadrant detector 101 outputs at an output terminal n1 one of three select signals: a select signal for the first or the second quadrant, a select signal for the third quadrant, and a select signal for the fourth quadrant. The select signal n1 is supplied to the selector 105.

The multiplier 102 multiplies the value i of the I signal by a reference input −1, and outputs the result θi=−i at a node n2. The adder 103 adds the value i of the I signal to reference input 2(Im), and outputs θi=2(Im)+i at a node n3. Similarly, the adder 104 adds the value i of the I signal to reference input −2(Im), and outputs θi=2(Im)+i at a node n4.

One of the nodes n2, n3 and n4 is selected by the selector 105 in accordance with the quadrant select signal n1, and is connected to a node n5. As is described above, when the signal point is positioned in the first or the second quadrant, the node 2 is selected by the selector 105; when the signal point is positioned in the third quadrant, the node n3 is selected by the selector 105; and when the signal point is positioned in the fourth quadrant, the node n4 is selected by the selector 105. As a result, the one-dimensional coordinate value θi obtained by conversion of the phase angle is generated at the node n5. In other words, the phase angle detector 10 generates the value θi obtained when the phase angle is mapped onto the one-dimensional coordinate.

A phase difference detector 14 calculates a phase difference Δθi between sequentially demodulated signal points. The phase difference detector 14 includes a delay flip-flop 15, for delaying the phase of a signal in accordance with a demodulation reference clock CLK; an adder 16, for calculating a difference between phases θi1 and θi2 of the sequential signal points; and a converter 17, for acquiring an absolute phase difference Δθi from the output θi2−θi1 of the adder 16. Specifically, the converter 17 performs the following conversion:

when θi2−θi1>2(Im), Δθi=n7(θi2−θi1)−4(Im);

when θi2−θi1<−2(Im), Δθi=n7(θi2=θi1)+4(Im);

and when −2(Im)≦θi2−θi1≦2(Im), Δθi=n7(θi2−θi1).

Therefore, even when the phase angle of the signal point is converted into the one-dimensional coordinate θi and is therefore changed across the border between −180° and +180°, the phase difference n8=Δθi can be detected.

The frequency discriminator further comprises an amplitude detector 12, for acquiring an amplitude for a signal point which is demodulated by using an I signal and a Q signal; and a signal point detector 18, for detecting an event during which signal points outside the mask circle S in FIG. 1 are sequentially demodulated. In this embodiment, in order to reduce the size of the circuit, the amplitude detector 12 does not calculate the distance from the origin on the phase plane to the signal point, but calculates the square ($i^2+q^2$) of the distance. That is, the amplitude detector 12 includes multipliers 121 and 122 and an adder 123 to calculate the square ($i^2+q^2$) of the distance, and outputs the square d1 of the amplitude for the signal point.

A comparator 19 compares the amplitude d1 with the square $(lm)^2$ of the radius lm of the mask circle S. When d1>$(lm)^2$, the output d2 goes to level H. And when the signal points outside the mask circle S are sequentially received, the output d4 goes to level H by the delay flip-flop 20 and an AND gate 21.

Upon the receipt of the detection signal d4, a complete integration circuit 22 accumulates the phase difference Δθi. Specifically, the complete integration circuit 22 includes an adder 23 and a flip-flop 24 for latching the output of the adder 23 when the detection signal d4 is at level H. The total of the accumulated phase differences (ΣΔθ; =±Δf) is output at a node n9 and is supplied as output OUT to the loop filter 64 shown in FIG. 4. The portion employed for accumulating the phase differences to obtain a frequency difference is the same as in the prior art in FIG. 2.

As is described above, the phase angle detector 10 of the frequency discriminator in FIG. 6 is constituted by the quadrant detector 101, which is in turn constituted by a simple decoder, the simple multiplier 102 and adders 103 and 104, and the selector 105, which is constituted by switches. Therefore, the phase angle detector 10 can be provided as a simple logic circuit which is appropriate for integration and has a high calculation speed.

In FIG. 5, with the counterclockwise direction at the point B being regarded as positive and the clockwise direction being regarded as negative, a phase angle of 0° to ±180° is converted into a one-dimensional coordinate having a value of from 0 to ±2(Im). However, the present invention is not limited to the above correspondence, and an arbitrary correspondence can be employed. For example, proceeding counterclockwise at point B, a phase angle of from 0° to 4(Im). The values enclosed by parentheses in FIG. 5 indicate such a correspondence. Therefore, the phase angles in the direction when moving from point B to C, to D and to A correspond to the coordinates of from 0 to 4(Im). At this time, three conversion expressions shown in the upper right in FIG. 5, i.e., −i, 2(Im)+i and 4(Im)−i, are required, and one of the results is selected in consonance with the quadrant which is detected.

Figure 7:
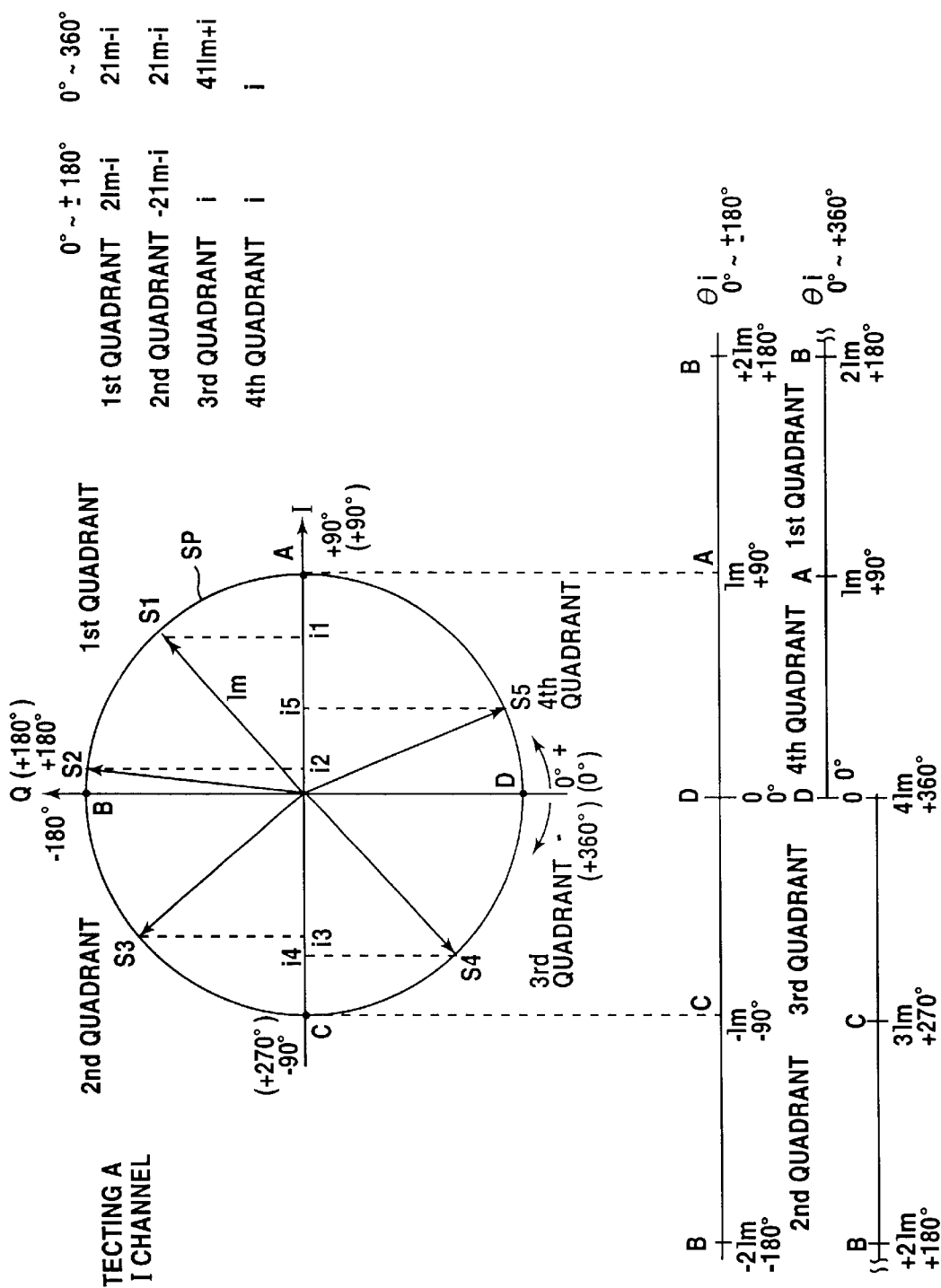
FIG. 7 is a diagram illustrating another example relationship between a phase angle and one-dimensional coordinate $\theta i$ when an I channel signal is used.

FIG. 7 is a diagram showing another example correlation of a phase angle with the one-dimensional coordinate θi when an I channel signal is employed. In this example, while the counterclockwise direction at point D is regarded as positive and the clockwise direction is regarded as negative, a phase angle of 0° to ±180° corresponds to a one-dimensional coordinate θi of from 0 to 2(Im). The expressions in this case are i, 2(Im)−1 and −2(Im), as is shown in the upper right in FIG. 7.

In FIG. 7 is also shown an example wherein proceeding counterclockwise at the starting point D, a phase angle of from 0° to 360° corresponds to a one-dimensional coordinate θi of from 0 to 4(Im). There are three expressions; 2(Im)−i, 4(Im)+i and I as described at the upper-right portion of FIG. 7.

Figure 8:
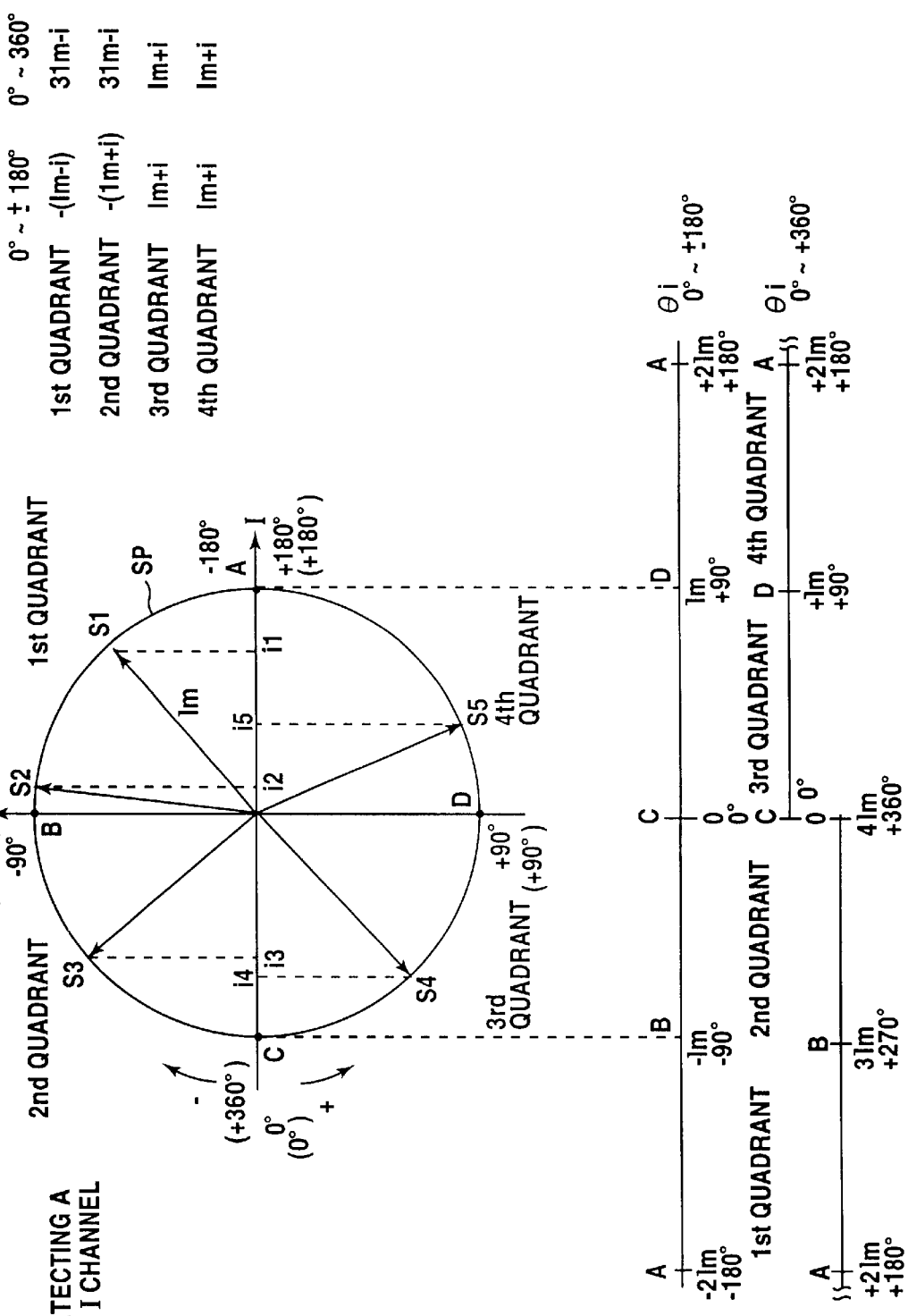
FIG. 8 is a diagram illustrating an additional example relationship between a phase angle and one-dimensional coordinate $\theta i$ when an I channel signal is used.

FIG. 8 is a diagram showing an additional example correlation of the phase angle with the one-dimensional coordinate θi when an I channel signal is employed. In this example, proceeding in the counterclockwise direction from point C is regarded as positive while proceeding in the clockwise direction is regarded as negative. The expressions used in this case are lm+i and −(lm+i), as is indicated in the upper right in FIG. 8, the same expression being used for the first and the second quadrants, and the same expression being used for the third and the fourth quadrants. In this case, therefore, the quadrant determiner can determine the quadrant in accordance with only the most significant bit of the Q signal.

In FIG. 8 is also shown an example where the phase angle of from 0° to 360° correlates with the one-dimensional coordinate of from 0 to 4(Im) when proceeding counterclockwise at the starting point C. The expressions are 3(Im)−i and Im+i. Therefore, as well as above, in accordance with the most significant bit of the Q signal the quadrant determiner can generate a quadrant determination signal to select the expression.

Similarly, a phase angle of from 0° to ±180° at point A can correlate with the one-dimensional coordinate θi of from 0 to ±2(Im), or a phase angle of from 0° to 360° proceeding from the starting point A can correspond to the one-dimensional coordinate θi of from 0 to 4(Im).

FIG. 9 is a table showing expressions used for the above eight conversion types when the I channel signal is employed. As is shown in FIG. 9, when a phase angle of from 0° to ±180° proceeding from point A is to correspond to a one-dimensional coordinate θi of from 0 to ±2(Im), two conversion expressions are employed: Im−i and −(Im−i). When a phase angle of from 0° to 360° proceeding from the starting point A is to correspond to a one-dimensional coordinate θi of from 0 to 4(Im), the conversion expressions are Im−i and 3(Im)+i.

Figure 10A:
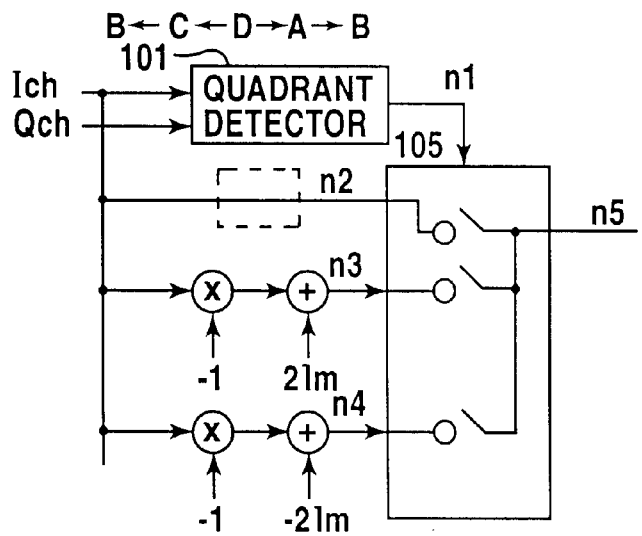
FIGS. 10A to 10C are circuit diagrams showing other phase detectors.
Figure 10B:
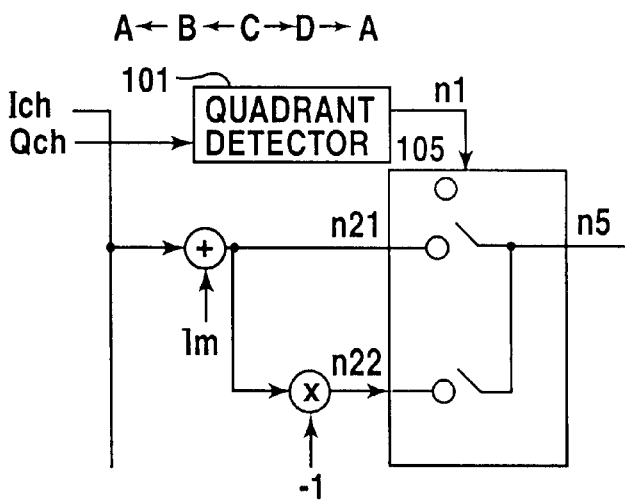
Figure 10C:
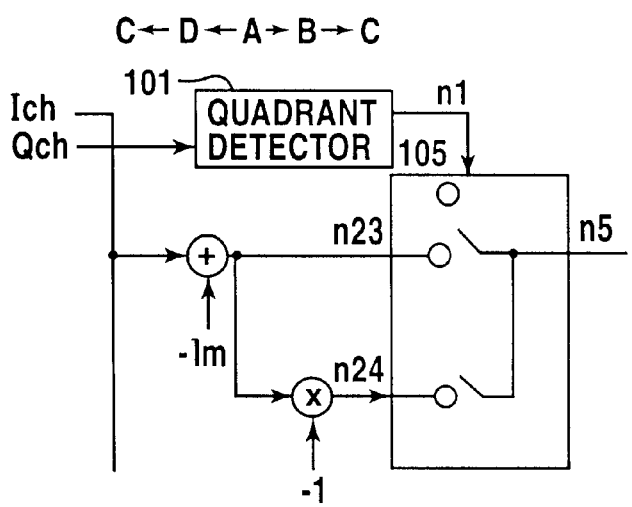

FIGS. 10A to 10C are circuit diagrams showing other example phase angle detectors. As is apparent from a comparison with the table in FIG. 9, in FIG. 10A is shown an example wherein a phase angle of from 0° to ±180° processing from point D corresponds to the one-dimensional coordinate θi of from 0 to ±2(Im). In this example, i, 2(Im)−i and −2(Im)−i are generated at the node n2, the node n3 and the node n4, respectively.

In FIG. 10B is shown an example where the phase angle of from 0° to ±180° proceeding fro point C corresponds to a one-dimensional coordinate of from 0 to ±2(Im). In this example, Im+i and −(Im+i) are generated at the nodes n21 and n22, respectively. In addition, only the Q signal is supplied to the quadrant detector 101. Therefore, there are two output select signals n1, or only one bit. For example, the most significant bit of the Q signal can be employed unchanged as a select signal n1.

In FIG. 10C is shown an example where the phase angle of form 0° to ±180° proceeding from point A corresponds to a one-dimensional coordinate of from 0 ±2(Im). In this example, −(Im−i) and Im−i are generated at the nodes n23 and n24, respectively. In addition, only at the nodes n23 and n24, respectively. In addition, only the Q signal is supplied to the quadrant detector 101. Therefore, there are two output select signals n1, or only one bit. For example, the most significant bit of the Q signal can be employed unchanged as a select signal n1.

It is easily understood that the operation circuit for the phase angle detector can be constituted in the same manner when phase angle of from 0° to 360° with the start points D, A, B and C is to correspond to the one-dimensional coordinate θi of from 0 to 4(Im) as shown in FIG. 9. It is preferable that a phase angle detector be employed which is constituted by the simplest operating circuit possible.

Figure 11:
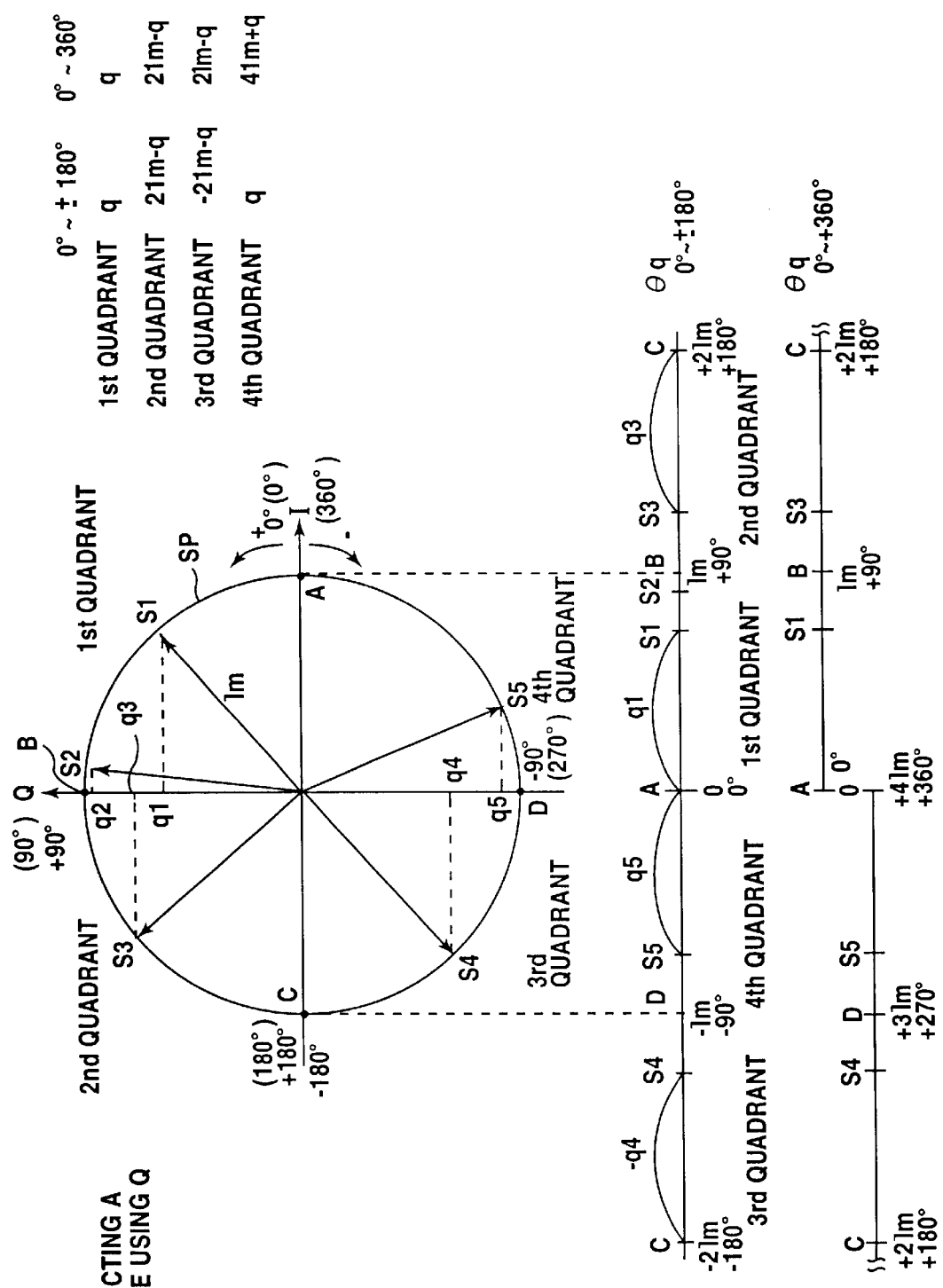
FIG. 11 is a diagram showing the principle for the detecting a phase angle according to the present invention.

FIG. 11 is a diagram showing an example of the principle of an examination of a phase angle which is performed when the Q signal is employed. In FIG. 11, similarly, the phase angle is converted into a one-dimensional coordinate θq by using the value q of the Q signal.

Figure 12:
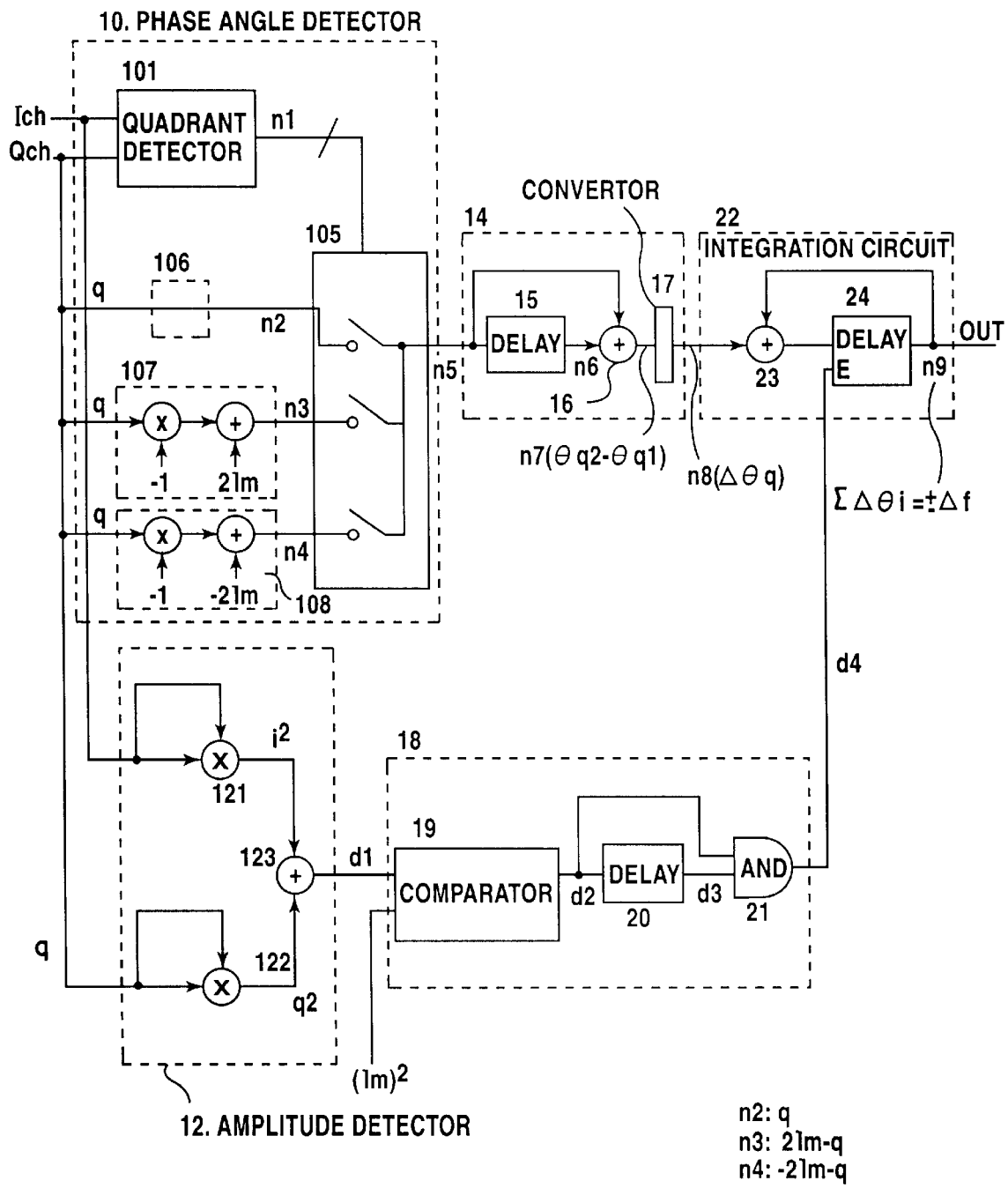
FIG. 12 is a circuit diagram illustrating a frequency discriminator according to a second embodiment of the present invention for which the principle shown in FIG. 11 is employed.

In the example using the uQ signal in FIG. 11, the phase angle is assigned to a value from 0° to ±180° proceeding counterclockwise from point A via point B to point C, and a value of 0° to −180° proceeding clockwise from point A via point D to point C. The phase angle of from 0° to ±180° proceeding from point A to B to C is converted to a one-dimensional coordinate θq of from 0 to Im to 2(Im), while the phase angle of from 0° to −180° fro point A to D to C is converted into a one-dimensional coordinate θq of from 0 to −Im to −2(Im). The conversion expressions for the individual quadrants are as follows.

first quadrant: q
second quadrant: 2(Im)−q
third quadrant: −2(Im)−q
fourth quadrant: q FIG. 12 is a circuit diagram showing a frequency discriminator according to a second embodiment employing the principle in FIG. 11. The same reference numerals as are used in FIG. 6 are used to denote corresponding or identical components in FIG. 12. The frequency discriminator in FIG. 12 is the same as that in FIG. 6, except that the phase angle detector 10 has a different structure. As is apparent from the above expressions, the phase angle detector 10 in FIG. 12 has the same structure as is shown in FIG. 10A.

Specifically, to provide the above expressions, the phase angle detector 10 in the frequency discriminator in FIG. 12 includes an operating circuit 106, for transmitting unchanged the value q for the Q signal to the node n2; a circuit 107, for calculating θq=2(Im)−q; and a circuit 108, for calculating θq=0−2(Im)−q. The circuits 107 and 108 are constituted by a multiplier and an adder, as is shown in FIG. 12.

In accordance with a select signal n1 generated by the quadrant determiner 101, the node n2 is connected to the node n5 for the first and the fourth quadrant, the node n3 is connected to the node n5 for the second quadrant, and the node n4 is connected to the node n5 for the third quadrant.

The components as shown in FIG. 6 are employed for a phase difference detector 14, for detecting a phase angle difference between sequential signal points; an amplitude detector 12; a signal point detector 18, for detecting the sequential reception of signal points located outside the mask circle S; and an integration circuit 22.

In FIG. 11 is also shown an example where the phase angle of from 0° to 360° proceeding from the starting point A is converted into a one-dimensional coordinate θq of from 0 to 4(Im). In this case, three expressions q, 2(Im)−q and 4(Im) are employed.

Figure 13:
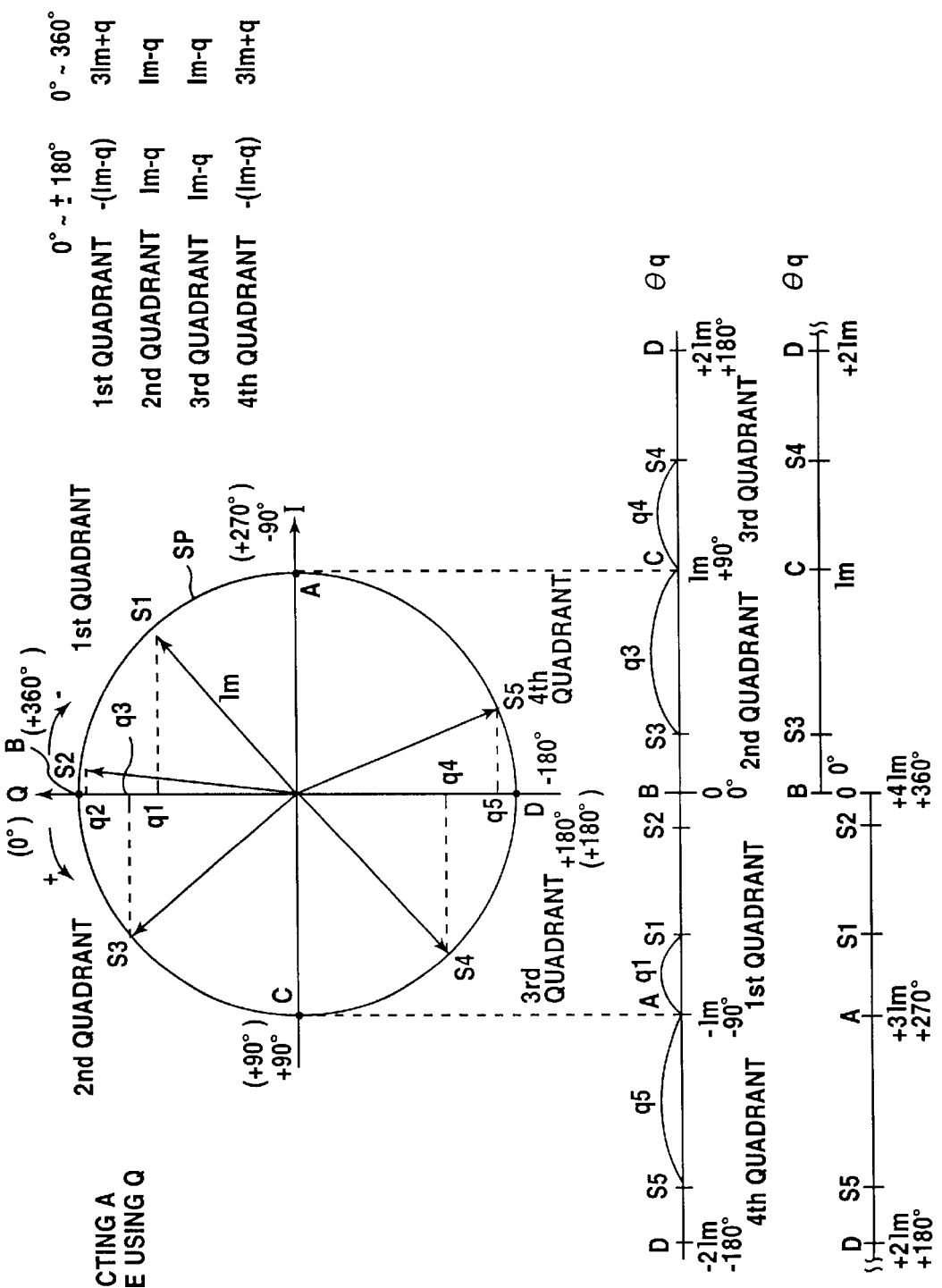
FIG. 13 is a diagram showing the principle for the detection of a phase angle when a Q channel signal is employed.

FIG. 13 is a diagram showing an example of the principle of the procedure employed for phase angle detection when another Q channel signal is used. In FIG. 13, the phase angle of from 0° to ±180° proceeding from point B is converted into the one-dimensional coordinate θq of from 0 to 2(Im). In this example, the conversion expressions are Im−q and −(Im−q), as is indicated in the upper right in FIG. 13. The same expression is employed for the second and the third quadrants, while the same expression is used for the first and the fourth quadrants.

In FIG. 13 is also shown an example where the phase angle of from 0° to 360° proceeding from starting point B is converted into the one-dimensional coordinate θq of from 0 to 4 (lm). The conversion expressions in this example are lm−q and 3(lm) +q. The same expression is used for the second and the third quadrants, and the same expression is used for the first and the fourth quadrants.

FIG. 14 is a table showing expressions used for converting the phase angle into the one-dimensional coordinate θq when the Q channel signal is used. Since this corresponds to the table in FIG. 9, no detailed explanation for it will be given. When the eight different methods in the table in FIG. 14 are employed, a phase angle detector employing the Q channel signal can be provided which has the same structure as has the phase angle detector employing the I channel signal.

Figure 15:
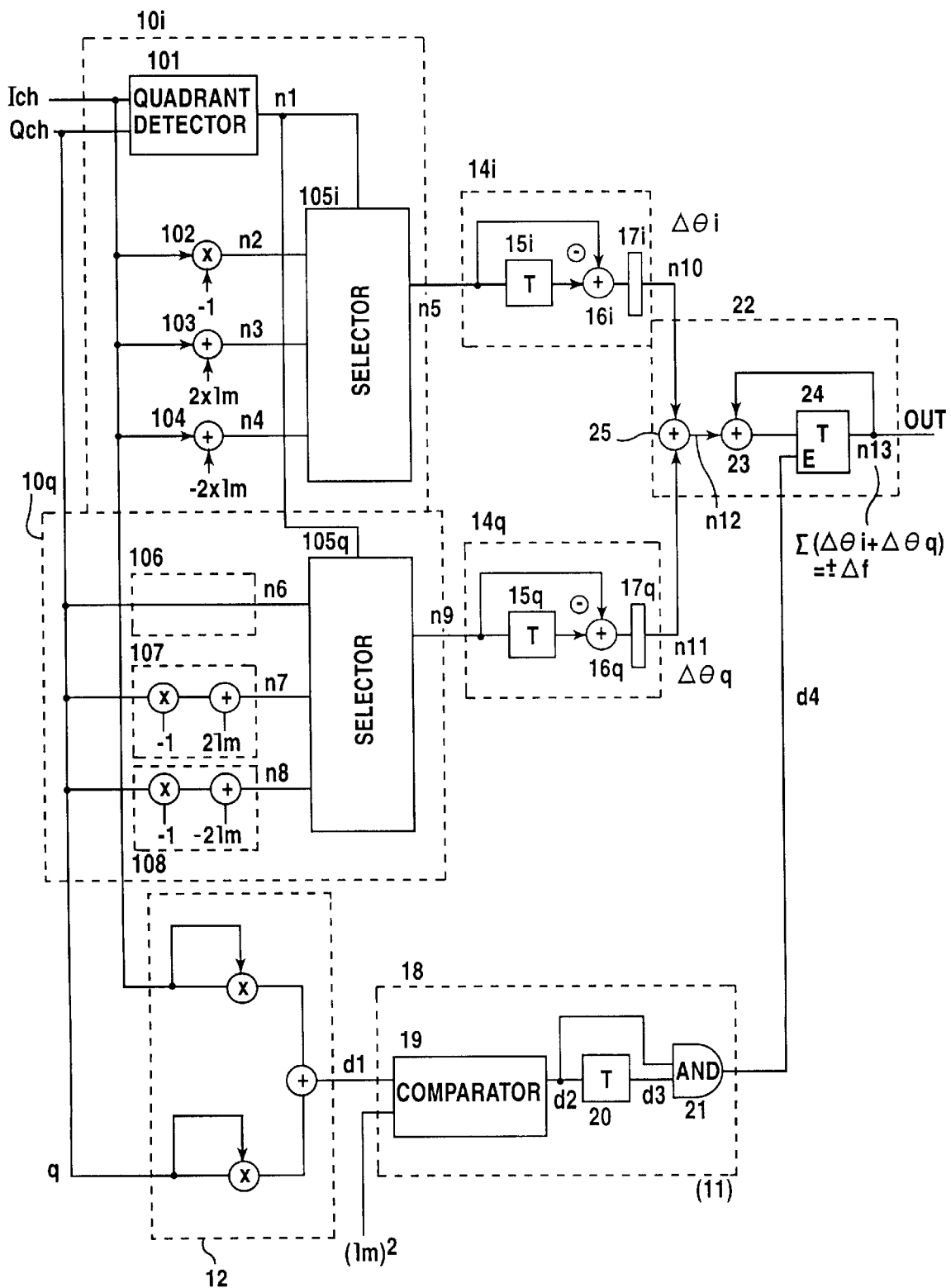
FIG. 15 is a circuit diagram illustrating a frequency discriminator according to a third embodiment of the present invention.

FIG. 15 is a circuit diagram illustrating a frequency discriminator according to a third embodiment of the present invention. The frequency discriminator comprises the phase angle detector 10i in FIG. 6, which employs the value i of the I signal, and the phase angle detector 10q in FIG. 12, which employs the value q of the Q signal.

As is apparent from the principles for the operation of the phase angle detectors in FIGS. 5 and 11, when the I signal in FIG. 5 is employed for the conversion of the phase angle to obtain a one-dimensional coordinate, the phase angle is converted into the one-dimensional coordinate θi using a conversion function which is similar to a sine wave curve. When the Q signal in FIG. 11 is employed, the phase angle is converted into the one-dimensional coordinate θq by using a conversion function which is similar to the sine wave curve when shifted 90°. As a result, after the phase angles are converted into the one-dimensional coordinates, less accurate phase differences Δθi and Δθq are obtained which depend on the location of the signal point. In the example in FIG. 15, however, the phase angle detectors 10i, 10q for both signals are provided, while the phase differences Δθi and Δθq, which lie between the sequential signal points and which are detected by the phase angle detectors, are added together, and integration of the result is performed. As a result, the frequency difference Af can be more accurately acquired.

As is shown in FIG. 15, provided are a phase angle detector 10i employing the I signal and a phase angle detector 10q employing the Q signal which have structures that are the same as those shown in FIGS. 6 and 12, with the exception that the quadrant detector 101 is employed in common. The calculation values selected by selectors 105i and 105q are output to respective nodes n5 and n9. The phase differences Δθi and Δθq, which lie between the sequential signal points are acquired by phase angle detectors 14i and 14q, and are respectively output at nodes n10 and n11. These phase differences are added together by an adder 25, and when a signal point detector 18 detects the sequential reception of signal points located outside the mask circles, in response to the signal d4 at level H a flip-flop in an integration circuit 22 latches the sum of the phase differences Δθi+Δθq. Therefore, a more accurate total phase difference value Σ(Δθi+Δθq) is obtained.

In the third embodiment in FIG. 15, an arbitrary combination of the methods shown in the tables in FIGS. 9 and 14 can be employed. When the angle value which has been converted into the one-dimensional coordinate by using the I channel signal is combined with the angle value which has been converted into the one-dimensional coordinate by using the Q channel signal, a difference between phase angles can be detected more accurately.

As is described above, in the frequency discriminator in the embodiments, a phase angle detector constituted by simple calculation circuits can acquire a phase angle for a signal point on the phase plane, from quadrant data on a plane phase on which the signal point is located, and the coordinate (the I coordinate or the Q coordinate, or both) of the signal point. Therefore, even when the phase angle detector is constituted by a customized logic circuit, its circuit structure is simplified.

Figure 16:
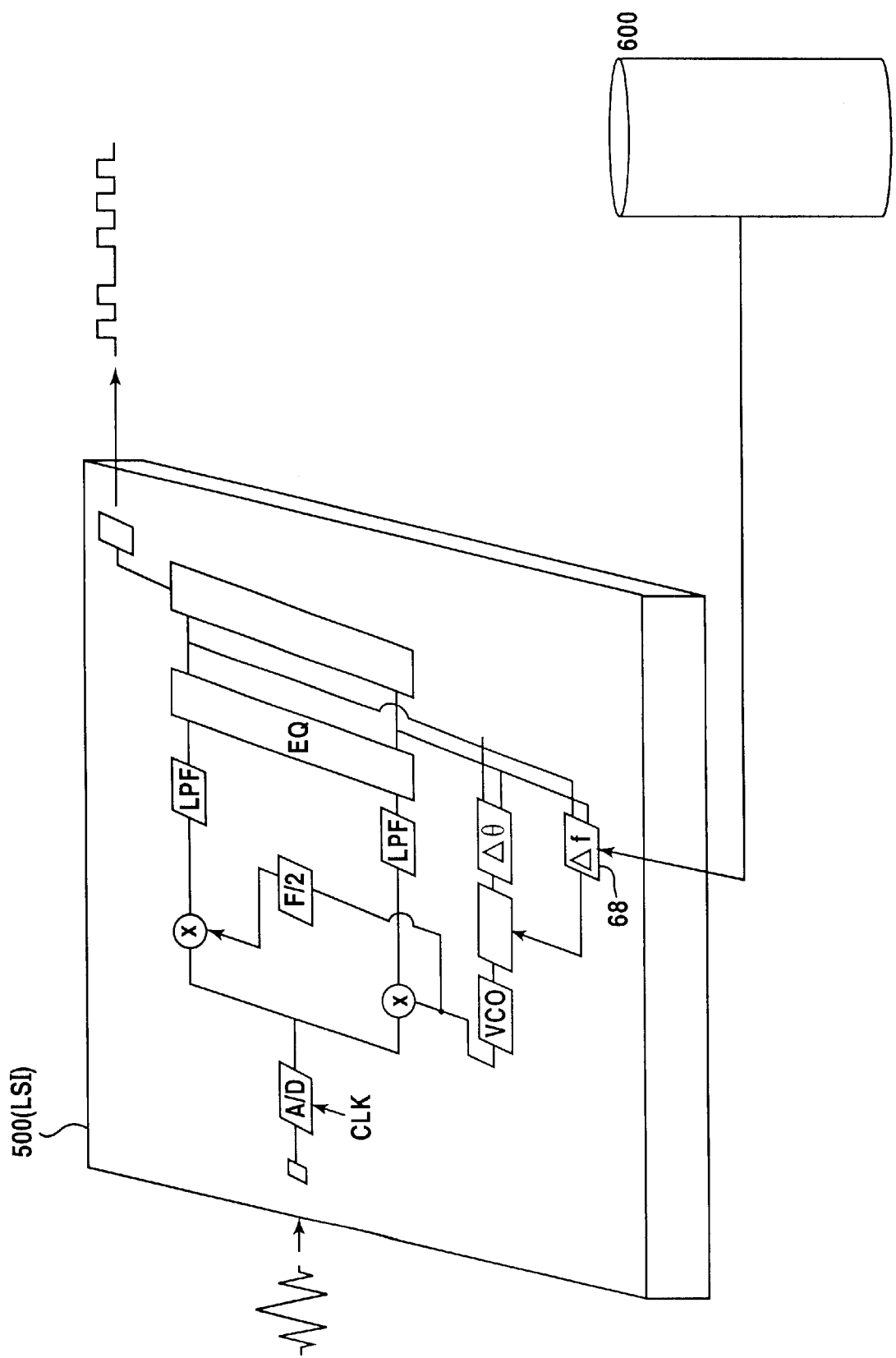
FIG. 16 is a diagram for explaining how a frequency discriminator according to the embodiments of the present invention is incorporated into a system LSI.

FIG. 16 is a diagram for explaining how the frequency discriminator according to the embodiments is incorporated in a system LSI. A frequency discriminator 68 according to the embodiments may be incorporated in a system LSI 500, which constitutes a multiple-QAM system demodulator. In this case, data for accomplishing a circuit for the frequency discriminator 68 are stored on a recording medium 600, such as a hard disk or a magnetic tape, and are employed to have the frequency discriminator 68 embeded in the system LSI. The circuit data for the frequency discriminator 68 to be stored in the recording medium 600 are, for example, described in a Verilog HDL or VHDL language.

As is described above, according to the present invention, quadrant data on the phase plane for an I channel signal or a Q channel signal, and a simple calculation circuit employing these signals, are used to acquire a phase angle for a signal point on the phase plane. Therefore, for the phase angle detector only a simple circuit structure is required.

In addition, since a frequency discriminator employs the phase angle detected by the above described phase angle detector to detect a frequency difference between a received signal carrier and a demodulation reference carrier, for the frequency discriminator also only a simple structure is required.

What is claimed is:

1. A phase angle detector, which detects a phase angle on a phase plane for a signal point specified by an I channel signal and a Q channel signal, comprising:
   a quadrant detection section for, in response to at least one of said I channel signal and said Q channel signal, detecting a quadrant on said phase plane for said signal point and for generating a quadrant detection signal; and
   a phase angle calculating section, including a plurality of calculation sections corresponding to the quadrant, for performing a calculation using whichever of said I channel signal or said Q channel signal corresponds to said quadrant detection signal to convert said phase angle on said phase plane into a phase angle for a predetermined one-dimensional coordinate, wherein said plurality of calculation sections are selected according to the quadrant detection signal.

2. A phase angle detector, which detects a phase angle on a phase plane for a signal point specified by an I channel signal and a Q channel signal, comprising:
   a quadrant detection section for, in response to said I channel signal and said Q channel signal, detecting a quadrant on said phase plane for said signal point and for generating a quadrant detection signal; and
   a phase angle calculating section, receiving said I (or Q) channel signal and including
      a first calculation section for generating $-i$ (or $-q$),
      a second calculation section for generating $2lm+i$ (or $2lm+q$) (lm is an amplitude value for a signal point), and
      a third operation section for generating $-2lm+i$ (or $-2lm+q$),
   for, in response to said quadrant detection signal, selectively outputting one of the products of said first to said third calculation sections.

3. A phase angle detector, which detects a phase angle on a phase plane for a signal point specified by an I channel signal and a Q channel signal, comprising:
   a quadrant detection section for, in response to said I channel signal and said Q channel signal, detecting a quadrant on said phase plane for said signal point and for generating a quadrant detection signal; and
   a phase angle operating section, receiving said I (or Q) channel signal and including
      a first calculation section for outputting said I (or Q) channel signal unchanged,
      a second calculation section for generating $2lm-i$ (or $2lm-q$) (lm is an amplitude value for a signal point), and
      a third calculation section for generating $-2lm-i$ (or $-2lm-q$),
   for, in response to said quadrant detection signal, selectively outputting one of the products of said first to said third calculation sections.

4. A phase angle detector, which detects a phase angle on a phase plane for a signal point specified by an I channel signal and a Q channel signal, comprising:
   a quadrant detection section for, in response to said Q (or I) signal, detecting a quadrant on said phase plane for said signal point and for generating a quadrant detection signal; and
   a phase angle calculating section, receiving said I (or Q) channel signal and including
      a first calculation section for generating $lm+i$ (or $lm+q$) (lm is an amplitude for said signal point), and
      a second calculation section for generating $-(lm+i)$ (or $-(lm+q)$),
   for, in response to said quadrant detection signal, selectively outputting one of the products of said first or said second calculation sections.

5. A phase angle detector, which detects a phase angle on a phase plane for a signal point specified by an I channel signal and a Q channel signal, comprising:
   a quadrant detection section for, in response to said Q (or I) signal, detection a quadrant on said phase plane for said signal point and for generating a quadrant detection signal; and
   a phase angle calculating section, receiving said I (or Q) channel signal and including
      a first calculation section for generating $lm-i$ (or $lm-q$) (lm is an amplitude for said signal point), and
      a second calculation section for generating $-(lm-i)$ (or $-(lm-q)$),
   for, in response to said quadrant detection signal, selectively outputting one of the products of said first or said second calculation sections.

6. A phase angle detector, which detects a phase angle on a phase plane for a signal point specified by an I channel signal and a Q channel signal, comprising:
   a quadrant detection section for, in response to said I channel signal and said Q channel signal, detecting a quadrant on said phase plane for said signal point and for generating a quadrant detection signal; and
   a phase angle calculating section, receiving said I (or Q) channel signal and including
      a first calculation section for generating $-i$ (or $-q$),
      a second calculation section for generating $2lm+i$ (or $2lm+q$) (lm is an amplitude value for a signal point), and
      a third calculation section for generating $4lm-i$ (or $4lm-q$),
   for, in response to said quadrant detection signal, selectively outputting one of the products of said first to said third calculation sections.

7. A phase angle detector, which detects a phase angle on a phase plane for a signal point specified by an I channel signal and a Q channel signal, comprising:
   a quadrant detection section for, in response to said I channel signal and said Q channel signal, detecting a quadrant on said phase plane for said signal point and for generating a quadrant detection signal; and
   a phase angle calculating section, receiving said I (or Q) channel signal and including
      a first calculation section for outputting said I (or Q) channel signal unchanged,
      a second calculation section for generating $2lm-i$ (or $2lm-q$) (lm is an amplitude value for a signal point), and
      a third calculation section for generating $4lm+i$ (or $4lm+q$),
   for, in response to said quadrant detection signal, selectively outputting one of the products of said first to said third calculation sections.

8. A phase angle detector, which detects a phase angle on a phase plane for a signal point specified by an I channel signal and a Q channel signal, comprising:

a quadrant detection section for, in response to said Q (or I) signal, detecting a quadrant on said phase plane for said signal point and for generating a quadrant detection signal; and a phase angle calculating section, receiving said I (or Q) channel signal and including a first calculation section for generating lm+i (or lm+q) (lm is an amplitude for said signal point), and a second calculation section for generating 3lm−i (or 3lm−q), for, in response to said quadrant detection signal, selectively outputting one of the products of said first or said second calculation sections.

9. A phase angle detector, which detects a phase angle on a phase plane for a signal point specified by an I channel signal and a Q channel signal, comprising:

a quadrant detection section for, in response to said Q (or I) signal, detecting a quadrant on said phase plane for said signal point and for generating a quadrant detection signal; and a phase angle calculating section, receiving said I (or Q) channel signal and including a first calculation section for generating lm−i (or lm−q) (lm is an amplitude for said signal point), and a second calculation section for generating 3lm+i (or 3lm+q), for, in response to said quadrant detection signal, selectively outputting one of the products of said first or said second calculation sections.

10. A frequency discriminator, for detecting a frequency difference between a quadrature amplitude modulation carrier and a demodulation reference carrier, comprising:

a phase angle detector, including a quadrant detection section for, in response to at least one of said I channel signal and said Q channel signal, detecting a quadrant on said phase plane for said signal point and for generating a quadrant detection signal, and a phase angle calculating section for performing an calculation using said I channel signal or said Q channel signal in response to said quadrant detection signal to convert said phase angle on said phase plane into a phase angle for a predetermined one-dimensional coordinate; and an integration circuit for receiving said phase angle for said one-dimensional coordinate, which is obtained by said phase angle detector, and for, when signal points outside a predetermined mask circle S are sequentially demodulated, accumulating a phase angle difference between said signal points.

11. A frequency discriminator, for detecting a frequency difference between a quadrature amplitude modulation carrier and a demodulation reference carrier, comprising:

a phase angle detector, including a quadrant detection section for, in response to at least one of said I channel signal and said Q channel signal, detecting a quadrant on said phase plane for said signal point and for generating a quadrant detection signal, and a first phase angle calculating section for performing an calculation using said I channel signal in response to said quadrant detection signal to convert said phase angle on said phase plane into a phase angle for a first predetermined one-dimensional coordinate, and a second phase angle calculating section for performing an calculation using said Q channel signal in response to said quadrant detection signal to convert said phase angle on said phase plane into a phase angle for a second predetermined one-dimensional coordinate, and and integration circuit for receiving said phase angles for said first and said second one-dimensional coordinates, which are obtained by said phase angle detector, and for, when signal points outside a predetermined mask circle S are sequentially demodulated, accumulating phase angle difference between said signal points.

12. A frequency discriminator, for detecting a frequency difference between a quadrature amplitude modulation carrier and a demodulation reference carrier, comprising:

a phase angle detector as cited in one of claims 2 to 9; and an integration circuit for receiving said phase angle on said one-dimensional coordinate, which is obtained by said phase angle detector, and for, when signal points outside a predetermined mask circle S are sequentially demodulated, accumulating a phase angle difference between said signal points.

* * * * *